July 15, 1941.
J. E. McBURNEY
2,249,714
GLASS MELTING FURNACE
Filed Feb. 27, 1940
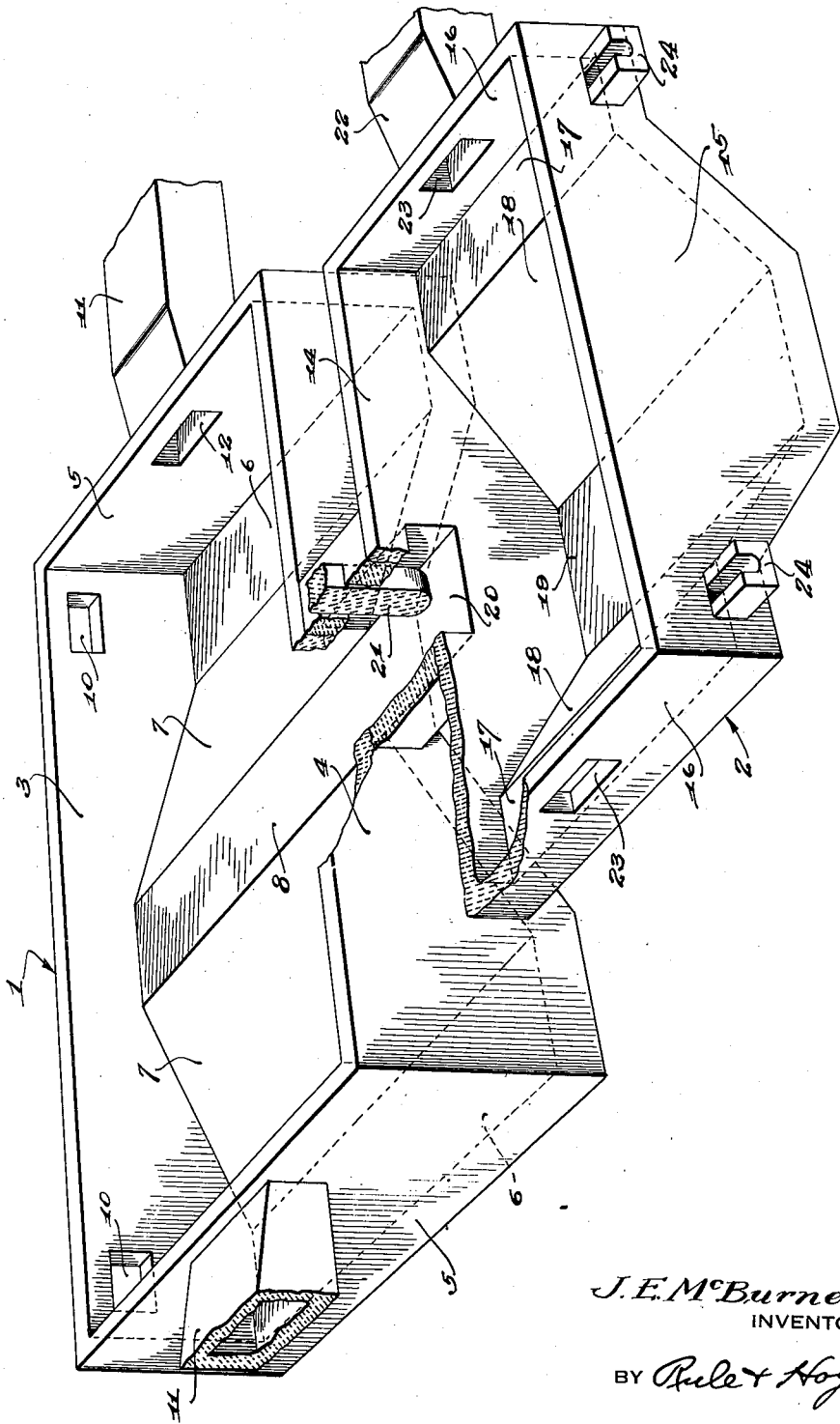
J. E. McBurney
INVENTOR
BY Rule & Hoge.
ATTORNEYS Patented July 15, 1941

2,249,714

UNITED STATES PATENT OFFICE 2,249,714

GLASS MELTING FURNACE

James E. McBurney, Alton, Ill., assignor to Owens-Illinois Glass Company, a corporation of Ohio Application February 27, 1940, Serial No. 321,073

7 Claims. (Cl. 49—54)

My invention relates to furnaces for melting and refining glass.

An object of the invention is to provide a furnace adapted to give economical and efficient operation with a comparatively small heat loss.

A further object of the invention is to provide a furnace so constructed that practically no unmelted batch will be carried from the melting compartment into the refining compartment, thereby facilitating the rapid and thorough refining of the molten glass.

A further object of the invention relates to a novel construction of the furnace in which only one pair of firing ports is required in either the melting or refining compartments, these ports firing across the length rather than the width of the chamber.

The furnace in its preferred form embodies a melting chamber having a floor construction such that the ends of the chamber are comparatively deep and the intermediate central portion relatively shallow, the furnace being provided adjacent its ends with ports to receive the raw batch materials. An object of the invention attained by the use of such a construction is to provide for storing up a large amount of heat in the glass and consequently transferring it to the freshly charged batch, while the hottest glass is near the center of the melting chamber, from which point it may be drawn off to the refining chamber.

A further object of the invention is to provide in combination with a melting chamber of the character indicated, a fining chamber having a floor construction such that the central portion of the fining chamber where the melted glass enters is comparatively deep. The glass then flows both ways toward the ends of the chamber and is fully fined and planed by the time it reaches the ends of the chamber or the ports through which it is discharged.

Other objects of the invention will appear hereinafter.

The accompanying drawing is a perspective view of a furnace constructed in accordance with my invention, parts being broken away to more fully illustrate the construction.

The furnace is built of refractory material and comprises a melting chamber 1 and a refining chamber 2 arranged side by side. The melting chamber is of rectangular construction comprising vertical side walls 3 and 4 and vertical end walls 5. The floor comprises horizontal end portions 6 extending inwardly from the end walls a short distance, intermediate sections 7 which extend from the horizontal section 6, being upwardly and inwardly inclined and terminating at a central horizontal section 8. The floor sections 6, 7 and 8 extend the full width of the chamber between the walls 3 and 4.

The batch materials are introduced into the furnace through openings 10 formed in the side wall 3 and preferably located near the ends of the furnace. The hot gases for melting the batch are introduced into the melting chamber through conduits 11 having port openings 12 into the chamber through the end walls thereof. The furnace may be provided with the usual regenerators. The construction just described includes only one pair of firing ports for the melting chamber, these ports being arranged to direct the hot gases through the furnace lengthwise thereof rather than across the width of the chamber as in conventional furnaces.

With the present construction the batch materials as they are melted move from both ends of the furnace toward the center thereof so that the hottest glass is at the central portion of the melting chamber, from which point it is discharged or caused to flow into the refining chamber 2. Owing to the depth and capacity of the end portions of the melting chamber where the batch is introduced, a large amount of heat may be absorbed and heat losses reduced. This construction also is such that comparatively little or no unmelted batch reaches the center of the furnace, so that there is no unmelted material introduced into the refining chamber to retard or interfere with the rapid and complete refining of the glass.

The refining chamber 2 comprises an inner side wall 14, an outer side wall 15 and end walls 16. The floor of this chamber comprises horizontal end sections 17, downwardly and inwardly inclined intermediate sections 18 extending from said end sections to a middle horizontal section 19. It will be observed that the floor of the refining chamber is substantially the reverse of the floor in the melting chamber. The central portion of the refining chamber is comparatively deep with shallow end portions. The two chambers may be arranged in parallelism and spaced a short distance apart. The upper margins of the side walls of the two chambers may be at substantially the same level as shown, although the relative height of the two furnaces may be varied within certain limits. Each of the chambers 1 and 2 is provided with a roof (not shown) which is preferably arched in keeping with conventional practice.

The glass is discharged from the melting chamber into the refining chamber through a spout 20 extending between the inner walls of the two chambers. The floor of the spout may be an extension of the floor section 8. The spout floor 20 may be more or less inclined and arranged to discharge the glass into the refining chamber at any desired level. A skimmer block is preferably provided at a suitable position to prevent scum or surface material from being carried into the refining chamber. I have shown such a skimmer block 21 positioned in the spout 20 intermediate the adjacent furnace walls.

Conduits 22 open into the refining chamber through ports 23 in the end walls of the chamber. The hot gases for refining the glass are conveyed through these conduits into the chamber. The refined glass may be drawn from the chamber through discharge spouts 24 which, as shown, are positioned in the outer side wall of the chamber adjacent the ends thereof. The floor of the refining chamber as shown and described is of such contour that the deepest glass is at the center and the shallowest glass at the ends of the chamber. The glass from the melting chamber enters the chamber 2 at the central portion thereof where the glass is hottest and flows both ways toward the ends, being fined and planed by the time it reaches the discharging position. The contour of the bottom of the chamber 2 may be altered as may be required to meet different working conditions.

By the use of a melting chamber of the construction disclosed, convection currents within the glass are reduced to a minimum. As a result, the freshly charged unmolten batch will mix with the molten glass to only a very limited extent if at all. The nearer the glass approaches the center of the chamber, the less will be the amount of unmolten material therein.

Modifications may be resorted to within the spirit and scope of my invention.

I claim:

1. A melting tank including a floor having end sections at a low level, an intermediate section at a higher level, inclined sections connecting said end sections with the intermediate section, means for introducing batch downward into the tank adjacent the ends thereof, means for supplying melting heat directly to the portions of the batch directly over said low level floor sections, and means for discharging the melted material from the intermediate shallow portion of the tank.

2. A melting tank including a floor having end sections at a low level, an intermediate section at a higher level, inclined sections connecting said end sections with the intermediate section, means for introducing fuel gas into the tank comprising conduits extending to the end walls of the tank and opening through ports in said end walls into the tank directly over said low level floor sections, means for introducing batch into the tank directly over the low level floor sections and subjecting it to the heating and melting action of the burning fuel gas while over said low level floor sections, and means for drawing the melted batch from the tank at a point directly over the said intermediate floor section.

3. A furnace tank comprising side walls, end walls and a floor, and conduits extending to the end walls and having port openings through said end walls into the furnace for conducting hot gases or flames into the furnace for melting the batch, one of the side walls having an opening therethrough for the discharge of molten material, the floor of the tank comprising sections at different levels including low level sections adjacent the end walls and high level intermediate sections, all extending from one side wall to the other of the tank and so arranged that the tank has comparatively great depth adjacent the end walls and is shallow adjacent the said discharge opening.

4. A furnace for melting and fining glass or the like comprising a melting tank and a refining tank arranged side by side, and a spout connecting said tanks intermediate the ends thereof for discharging molten material from the melting tank to the refining tank, the melting tank having deep end portions and being comparatively shallow adjacent said spout and the refining tank being comparatively deep where the spout discharges thereinto.

5. A furnace for melting and fining glass or the like comprising a melting tank and a refining tank arranged side by side, and a spout connecting said tanks for discharging molten material from the melting tank to the refining tank, the melting tank being comparatively deep adjacent the ends thereof and the refining tank comparatively shallow adjacent the ends thereof.

6. A furnace for melting and fining glass or the like comprising a melting tank and a refining tank arranged side by side, a spout connecting said tanks for discharging molten material from the melting tank to the refining tank, the melting tank being comparatively deep adjacent the ends thereof and the refining tank comparatively shallow adjacent the ends thereof, means for introducing hot gases into the refining tank at the ends thereof and directing them through the tank in the direction of its length, and means for discharging the refined material from the shallow end portions of the refining tank.

7. A melting and refining furnace comprising a melting tank and a refining tank placed side by side and spaced apart, said melting tank having a floor including a high level central section, low level end sections, and intermediate sections, a refining tank having a low level central section, high level end sections and inclined intermediate sections, and a spout arranged to discharge melted material directly from the high level section of the melting tank to the low level section of the refining tank.

JAMES E. McBURNEY.